United States Patent [19]
Yabuta et al.

[11] Patent Number: 5,556,933
[45] Date of Patent: Sep. 17, 1996

[54] POLYACYLURETHANE AND PROCESS FOR PRODUCING THE SAME

[75] Inventors: Masami Yabuta, Katano; Satoshi Urano, Tsuzuki-gun, both of Japan

[73] Assignee: Nippon Paint Co., Ltd., Osaka, Japan

[21] Appl. No.: 432,705

[22] Filed: May 2, 1995

[30]    Foreign Application Priority Data

May 6, 1994  [JP]  Japan ................... 6-094235

[51] Int. Cl.⁶ .................................. C08G 18/71
[52] U.S. Cl. ................. 528/26; 528/35; 528/38; 528/369
[58] Field of Search ............... 528/369, 35, 38, 528/26

[56]          References Cited

U.S. PATENT DOCUMENTS 3,383,400  5/1968  Meisert et al. .................. 260/453

FOREIGN PATENT DOCUMENTS

| 753566 | 7/1970 | Belgium . |
| 0164661 | 5/1985 | European Pat. Off. . |
| 61-272224 | 12/1986 | Japan . |

OTHER PUBLICATIONS

Chemical Abstracts 122:134220, "Polyacylpolyurethanes and Their Manufacture".
Chemical Abstracts 121:58121, "Synthesis of Poly (N–acylurethanes, A New Class of Polyurethanes".
Chemical Abstracts 82:58490, "Poly(iminodicarboxylates)".

*Primary Examiner*—Frederick Krass
*Attorney, Agent, or Firm*—Townsend & Banta

[57]          ABSTRACT

The present invention provides a novel polyacylurethane, and a process for producing the same. More specifically, the polyacylurethane has a number average molecular weight of 500 to 100,000, and the main chain of said polyacylurethane comprises repeating units of the formula:

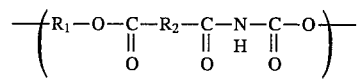

where $R_1$ represents an alkylene group or an alkenylene group having a molecular weight of 28 to 30,000, which may contain an alicylcic group, an aromatic group and/or an oxygen atom; and $R_2$ represents an alkylene group, an arylene group or an alkenylene group having 1 to 8 carbon atoms.

15 Claims, No Drawings

POLYACYLURETHANE AND PROCESS FOR PRODUCING THE SAME

FIELD OF THE INVENTION

The present invention relates to novel polyacylurethane and a process for producing the same.

PRIOR ART

An acyl carbamate group has high reactivity in comparison to a usual ester group and it reacts with an active hydrogen group such as hydroxyl group even in the absence of a catalyst. Accordingly, polyacylurethane, which is a polymer having a main chain linked by multiple acyl carbamate groups, is expected to be used for various industrial applications such as a modifier for a hydroxyl group-containing material, a high functional coating composition and an adhesive.

However, the polyacylurethane has scarcely been studied heretofore, and only some limited bulletin states its example.

For example, Japanese Laid-Open Patent Publication No. 61-1653 discloses the polyacylurethane obtained by reacting N-alkoxycarbonyl cyclic imide with polyol according to the scheme:

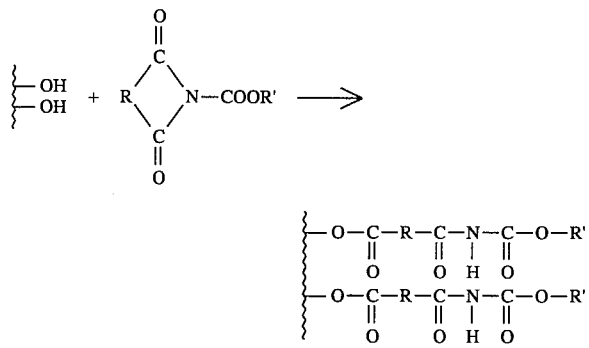

wherein the corrugated moiety represents a residue of polyol; and R and R' represent a hydrocarbon group.

In "Polymer Preprints, Japan", Vol. 42, No. 6, 1993, pp. 1922–1924, there is also disclosed the polyacylurethane obtained by polyaddition of diacyl isocyanate to diol according to the scheme:

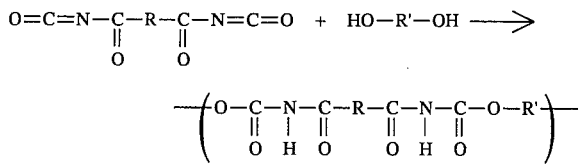

wherein R and R' are the same as defined above.

SUMMARY OF THE INVENTION

The present invention provides novel polyacylurethane, and a process for producing the same. More specifically, the present invention provides polyacylurethane having a molecular weight of 500 to 100,000, wherein a main chain of said polyacylurethane is substantially composed of a repeating unit of the formula:

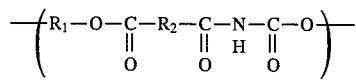

wherein $R_1$ represents an alkylene group or an alkenylene group having a molecular weight of 28 to 30,000, which may contain an alicyclic group, an aromatic group and/or an oxygen atom; and $R_2$ represents an alkylene group, an arylene group or an alkenylene group having 1 to 8 carbon atoms.

DETAILED DESCRIPTION OF THE INVENTION

Polyacylurethane of the present invention includes not only a homopolymer having the same combination of $R_1$ and $R_2$, which consists of the same repeating unit, but also a copolymer having unspecified $R_1$ and $R_2$, which consists of the different repeating units.

In the preferred embodiment of the present invention, $R_1$ represents a residue of diol. By using diol as a raw material, it becomes easy to prepare the present polyacylurethane. The wording "a residue of diol" used herein means a divalent group which is left when two hydroxyl groups of the diol are eliminated. Diol employed in the present invention is not specifically limited, and include any diol of which residue is able to be compatible with a hydroxyl group and an acyl carbamate moiety. Examples of diol include various low-molecular weight, oligomeric and high-molecular weight diols.

The wording "low-molecular diol" used herein means diol having not more than about 18 carbon atoms. In the present invention, diol preferably has not more than 15 carbon atoms, more preferably not more than 12 carbon atoms, because such a diol is easily available as a raw material.

Preferred examples of the low-molecular diol include alkanediols such as ethylene glycol, 1,2-propylene glycol, 1,3-propylene glycol, 1,3-butanediol, 1,4-butanediol, 1,4-pentanediol, 1,5-pentanediol, neopentyl glycol, 1,6-hexanediol, 1,9-nonanediol, 1,10-decanediol, 1,12-dodecanediol, 1,2-octadecanediol, 1,8-octadecanediol, 2,5-dimethyl-2,5-hexanediol, 2,2-dimethyl-1,3-propanediol and 2,5-diethyl-2,5-hexenediol; alkenediols such as 2-butenediol and 3-hexenediol; ether bond-containing diols such as diethylene glycol and triethylene glycol; alicyclic group-containing diols such as 1,2-cyclohexanediol, 1,3-cyclohexanediol, 1,4-cyclohexanediol, 1,2-cyclopentanediol, 1,2-cyclooctanediol, 1,4-cyclooctanediol, 1,5-cyclooctanediol and dicyclohexyl-4,4'-diol; and arylalkylene group-containing diols such as 1,2-benzene dimethanol.

The wording "oligomeric and high-molecular diol" used herein means diol having a number-average molecular weight of more than 300. The oligomeric and high-molecular diol used in the present invention generally has a number-average molecular weight of 300 to 30,000, preferably 300 to 5,000, more preferably 300 to 3,000, because such a diol is easily handled as a raw material.

Examples thereof include polyethylene glycol, polycaprolactone diol, polytetrahydrofuran diol, polypropylene glycol, polybutadiene diol and polydimethylsiloxane diol.

$R_2$ preferably has up to 8, more preferably up to 6 carbon atoms. Particularly preferred examples of $R_2$ in the present invention include divalent hydrocarbon groups such as an ethylene group, a 1,2-phenylene group, a 1,2-cyclohexylene group and an ethynyl group.

It is preferred that the present polyacylurethane is prepared by condensation polymerizing at least one acyl carbamate of the formula:

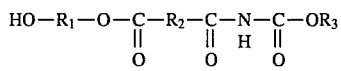

wherein $R_1$ and $R_2$ represents the same groups as described above; and $R_3$ represents an alkyl or aryl group having 1 to 18, preferably 1 to 8, more preferably 1 to 4 carbon atoms, which may contain an oxygen atom. The monoalcohol having more than 18 carbon atoms hardly be available.

Examples of $R_3$ include hydrocarbon groups such as a methyl group, an ethyl group, a n-propyl group, an isopropyl group, a n-butyl group, an isobutyl group, a t-butyl group, an amyl group, a hexyl group, a cyclohexyl group, an octyl group, a 2-ethylhexyl group, a nonyl group, a decanyl group, a stearyl group, a benzyl group, an allyl group, a propargyl group and a phenyl group; and oxygen-containing hydrocarbon groups such as a methoxyethyl group, a methoxypropyl group, an ethoxyethyl group, a butoxyethyl group, a hexyloxyethyl group, a methoxyethyloxy group, an ethoxyethyloxyethyl group and a butoxyethyloxyethyl group.

The condensation polymerization can be conducted in the presence or in the absence of a solvent depending on properties of acyl carbamate employed, according to any procedure known to those skilled in the art. When a solvent is employed, it is preferred that the solvent contains no active hydrogen in order to avoid reacting a solvent with a solute. Preferred is an aprotic solvent.

Examples of the solvent include hydrocarbon solvents such as benzene, toluene and xylene; halogenated hydrocarbon solvents such as o-dichlorobenzene; ester solvents such as butyl acetate; ketone solvents such as cyclohexanone; amide solvents such as DMF; sulfoxide solvents such as DMSO; and ether solvents such as dioxane.

The present polyacylurethane generally be prepared by reacting at 80° to 250° C., preferably 100° to 200° C., more preferably 120° to 180° C., under a normal pressure, preferably a reduced pressure of not more than 1 mmHg, during suitable time, e.g., about 3 hours. The resulting polyacylurethane generally has a molecular weight of 500 to 100,000, preferably 500 to 50,000, more preferably 1,000 to 10,000. If a molecular weight of the resulting polyacylurethane is less than 500, polymerization may not have proceeded sufficiently. On the other hand, it is difficult to obtain a polyacylurethane having a molecular weight Of more than 100,000.

A polyacylurethane having a molecular weight of not more than 10,000 is generally preferred for use in a coating composition, and that having a molecular weight of more than 10,000, particularly more than 30,000 is generally preferred for use in a molding composition.

As a demand for environmental protection and safety of handling, aqueous and high functional polymeric materials such as an aqueous coating composition is required. It is important to control polarity of the polymeric components of such an aqueous polymeric material and particularly to lead it to high polarity in order to improve water solubility or water dispersibility of the polymeric components. Thereby, compatibility of the polymeric components each other as well as adhesion of the coated film are also improved.

Polyacylurethane has high polarity and has high reactivity to the active hydrogen group such as hydroxyl group even in the absence of a catalyst. Therefore, it has generally been expected to be applied for modifying, and particularly polarizing a polymeric material.

Conventional polyacylurethane is however generally derived from symmetrical diacyl isocyanate and symmetrical diol as described above. Thus, it essentially contains two acyl carbamate moieties which are symmetrically arranged in one repeating unit. The two symmetrical acyl carbamate moieties have high reactivity with the active hydrogen group, and when the both two acyl carbamate moieties react with two active hydrogen groups, the two active hydrogen groups are bonded by the polyacylurethane.

Accordingly, when the conventional polyacylurethane is employed as a modifier for a polymerlc material containing an active hydrogen group, two of the active hydrogen group may be crosslinked by the polyacylurethane and the polymeric material may gel.

On the other hand, the present polyacylurethane is a self-condensed product, and is characterized by a repeating unit containing one acyl carbamate moiety which is always arranged in the same direction. That is, the present polyacylurethane essentially has an acyl carbamate moiety on one end and a hydroxyl group on the other end.

The acyl carbamate moiety of the present polyacylurethane also has a high reactivity with the active hydrogen group, but the hydroxyl group do not react with the active hydrogen group. Accordingly, when the present polyacylurethane is employed as a modifier for a polymeric material containing an active hydrogen group, any two of the active hydrogen group do not be crosslinked by the polyacylurethane, and therefore the polymeric material does not gel.

The present polyacylurethane has homogeneously arranged repeating units as described above, and when it is employed for a polymeric material, physical properties such as aggregation properties, rigidity are remarkably improved in comparison with a conventional one. Furthermore, the present polyacylurethane is easily decomposed with water, and has characteristics inherent in polyacylurethane.

Accordingly, the present polyacylurethane can be applied for polymeric materials having recycling and decomposing properties, novel high functional plastic materials, fibers, films and other high functional polymeric materials.

EXAMPLES

The following Examples further illustrate the present invention in detail but are not to be construed to limit the scope thereof.

Example 1

Ethyl N-{2-(2-hydroxyethyloxycarbonyl)benzoyl}carbamate (colorless oil) was charged in a Kugel Roll vacuum distiller, and was heated with reducing a pressure by means of an aspirator. After completion of the reaction, the content was cooled to room temperature to give white semisolid. Table 6 shows conditions for the reaction. Table 1 shows structure, properties and spectrum data of the resulting polyacylurethane.

Example 2

Ethyl N-{2-(6-hydroxyhexyloxycarbonyl)benzoyl}carbamate (light brown oil) was charged in a 100 ml three-necked flask equipped with a nitrogen inlet tube and a decanter, and was heated to 120° C. with stirring by means of a mechanical stirrer in the absence of a solvent and a catalyst (The inner temperature was measured by a thermocouple.). Ethanol was distilled into the decanter. After about 3 hours, the decanter and the nitrogen inlet tube were removed, and a dry ice-IPA trap was attached instead, and then pressure was reduced by means of a vacuum pump and the reaction was continued, additionally. After completion of the reaction, the content was cooled to room temperature to give light brown glass-like solid. Table 6 shows conditions for the reaction. Table 2 shows structure, properties and spectrum data of the resulting polyacylurethane.

Example 3

Ethyl N-{3-(2-hydroxyethyloxycarbonyl)propionyl}carbamate and dioxane were charged in a test tube, and the bottom of the test tube was dipped in an oil bath heated at 160° C. to reflux and react the content. After completion of the reaction, dioxane was distilled off under reduced pressure to give light yellow oil. Table 6 shows conditions for the reaction. Table 3 shows structure, properties and spectrum data of the resulting polyacylurethane.

Example 4

Recrystallized ethyl N-{3-(6-hydroxyethyloxycarbonyl)propionyl}carbamate (white crystal) was charged in a 100 ml three-necked flask equipped with a nitrogen inlet tube and a decanter, and was heated to 150° C. with stirring by means of a mechanical stirrer in the absence of a solvent and a catalyst (The inner temperature was measured by a thermocouple and the crystal of ethyl N-{3-(6-hydroxyethyloxycarbonyl)propionyl}carbamate melted with heating.). Ethanol was distilled into the decanter during the reaction.

After about 3 hours, the decanter and the nitrogen inlet tube were removed, and a dry ice-IPA trap was attached instead, and then pressure was reduced by means of a vacuum pump and the reaction was continued, additionally. After completion of the reaction, the content was cooled to room temperature to give light brown rubber-like solid. Table 6 shows conditions for the reaction. Table 4 shows structure, properties and spectrum data of the resulting polyacylurethane.

Example 5

According to the same manner as described in Example 4 except for reacting at a normal pressure for 3 hours and at a reduced pressure of not more than 1 mmHg for additional 20 hours, polyacylurethane having a molecular weight (Mn) of 23,000 was obtained.

Example 6

According to the same manner as described in Example 4 except for reacting at a normal pressure for 3 hours and at a reduced pressure of not more than 1 mmHg for additional 20 hours, polyacylurethane having a molecular weight (Mn) of 48,000 was obtained.

Example 7

Ethyl N-{2-(6-hydroxyhexyloxycarbonyl)benzoyl}carbamate (0.34 g) and ethyl N-{2-(3-hydroxy-2,2-dimethylpropyloxycarbonyl)benzoyl}carbamate (0.323 g) were charged in a 100 ml three-necked flask, and heated at 120° C. with stirring by means of a mechanical stirrer for 3 hours in the absence of a solvent and a catalyst under a reduced pressure of not more than 1 mmHg to give a copolymer. Table 6 shows conditions for the reaction. Table 5 shows structure, properties and spectrum data of the resulting polyacylurethane.

TABLE 1

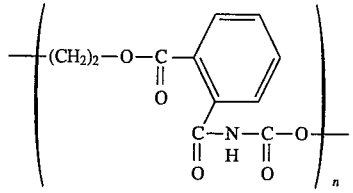

| Appearance | white resinous oil |
|---|---|
| Mn/Mw | 780/950 |
| IR(cm$^{-1}$) (KBr tablet) | 3500(OH), 3250(NH), 1760(CONHCOO), 1720(CONHCOO), 1280(PhCOOC), 1200(CONHCO) |

TABLE 2

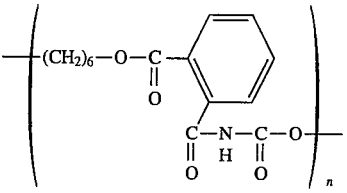

| Appearance | light brown solid |
|---|---|
| Tg(°C.) | 30 |
| Mn/Mw | 2000/3300 |
| $^1$H-NMR(ppm) (360MHz, CDCl$_3$) | δ; 1.20–1.88(m, 8H, —OCH$_2$(CH$_2$)$_4$CH$_2$O—), 4.04(br, 2H, NHCOOCH$_2$) 4.28(br, 2H, CH$_2$OCOPh), 7.35(br, 1H, Ph) 7.51(br, 1H, Ph)7.64(br, 1H, Ph), 8.01(br, 1H, Ph) |
| IR(cm$^{-1}$) (KBr tablet) | 3270(NH), 1765(CONHCOO) 1720(CONHCOO), 1295(PhCOOC), 1200(CONHCO) |

TABLE 3

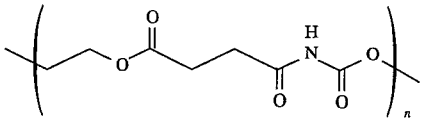

| Appearance | light yellow oil |
|---|---|
| Mn/Mw | 1330/1970 |
| $^1$H-NMR (ppm) (360MHz, CDCl$_3$) | δ; 2.43–2.59(br, 4H, —CH$_2$CH$_2$CONHCOO—), 4.15–4.32(br, 4H, —CONHCOOCH$_2$CH$_2$—) |
| IR(cm$^{-1}$) (KBr film) | 3270, 1765(CONHCOO), 1720(CONHCOO), 1200(CONHCO) |

TABLE 4

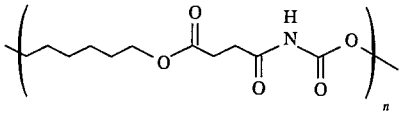

| Appearance | brown oil |
|---|---|
| Tg, Tm(°C.) | −1.0, 57 |
| Mn/Mw | 6310/13200 |
| $^1$H-NMR(ppm) (360MHz, CDCl$_3$) | δ; 1.40(br, 4H, —O(CH$_2$)$_2$—(CH$_2$)$_2$—(CH$_2$)$_2$O—), 1.71(br, 4H, —OCH$_2$CH$_2$(CH$_2$)$_2$CH$_2$CH$_2$O—), 2.64(br, 2H, —CH$_2$CONHCOO), 2.76–3.05 |

TABLE 4-continued

| | |
|---|---|
| | (br, 1H, —C$\underline{H}_2$CH$_2$CONHCOO—), |
| | 3.05–3.18(br, 1H, —CH$_2$C$\underline{H}_2$CONHCOO—), |
| | 4.11(br, 2H, CONHCOOC$\underline{H}_2$—), |
| | 4.15(br, 2H, CH$_2$COOC$\underline{H}_2$—) |
| IR(cm$^{-1}$) | 3300(NH), 1780(CONH$\underline{C}$OO), |
| (KBr film) | 1730($\underline{C}$ONHCOO), 1200(CONHCO) |

TABLE 5

Formula

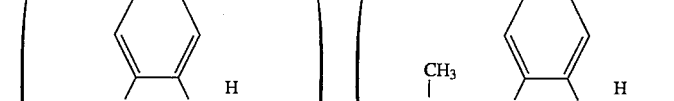

| | |
|---|---|
| Appearance | colorless clear solid |
| Mn/Mw | 910/1340 |
| $^1$H-NMR(ppm) | δ; 0.98(s, 3H, CH$_3$), 1.15–1.82(br, 8H, —CH$_2$(C$\underline{H}_2$)$_4$—CH$_2$—OCOPh) |
| (360MHz, CDCl$_3$) | 3.38(s, 2H, O—C$\underline{H}_2$C(CH$_3$)$_2$CH$_2$—O), 4.05(br, 4H, CONHCOOC$\underline{H}_2$) |
| | 4.18(s, 2H, C(CH$_3$)$_2$C$\underline{H}_2$OCOPh), 4.25(br, 2H, (CH$_2$)$_5$C$\underline{H}_2$OCOPh) |
| | 7.35, 7.50, 7.58, 8.02(br, 8H, Ph), 9.39(br, 2H, NH) |
| IR(cm$^{-1}$) | 3500(OH), 3230(NH), 1780, 1760(CONHCOO), 1720, 1700(C$\underline{O}$NHCOO), |
| (KBr tablet) | 1290(PhCOOC), 1200(CONHCO) |

TABLE 6

| Examples | Solvent (g) | Temperature (°C.) | Pressure (mmHg) | Reaction time (h) |
|---|---|---|---|---|
| 1 | None | 140 | 40–50 | 1 |
| 2 | None | 120 | 760 | 3 |
| | | | <1.0 | 3.5 |
| 3 | Dioxane (3.0) | 160 (bath temp.) | 760 | 3 |
| 4 | None | 150 | 760 | 4 |
| | | | <1.0 | 3 |
| 5 | None | 150 | 760 | 3 |
| | | | <1.0 | 20 |
| 6 | None | 170 | 760 | 3 |
| | | | <1.0 | 20 |
| 7 | None | 120 | <1.0 | 3 |

What is claimed is:

1. Polyacylurethane having a number average molecular weight of 500 to 100,000, wherein the main chain of said polyacylurethane comprises repeating units of the formula:

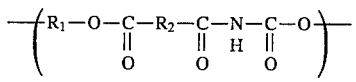

wherein R$_1$ represents an alkylene group or an alkenylene group having a molecular weight of 28 to 30,000, which may contain an alicyclic group, an aromatic group and/or an oxygen atom; and R$_2$ represents an alkylene group, an arylene group or an alkenylene group having 1 to 8 carbon atoms.

2. The polyacylurethane according to claim 1, wherein R$_1$ represents a residue of diol having 1 to 18 carbon atoms.

3. The polyacylurethane according to claim 1, wherein R$_1$ represents a residue of diol selected from the group consisting of alkanediol, alkenediol, ether bond-containing diol, alicyclic group-containing diol and arylalkylene group-containing diol.

4. The polyacylurethane according to claim 1, wherein R$_1$ represents a residue of diol selected from the group consisting of ethylene glycol, 1,2-propylene glycol, 1,3-propylene glycol, 1,3-butanediol, 1,4-butanediol, 1,4-pentanediol, 1,5-pentanediol, neopentyl glycol, 1,6-hexanediol, 1,9-nonanediol, 1,10-decanediol, 1,12-dodecanediol, 1,2-octadecanediol, 1,8-octadecanediol, 2,5-dimethyl-2,5-hexanediol, 2,2-dimethyl-1,3-propanediol, 2,5-diethyl-2,5-hexenediol, 2-butenediol, 3-hexenediol, diethylene glycol, triethylene glycol, 1,2-cyclohexanediol, 1,3-cyclohexanediol, 1,4-cyclohexanediol, 1,2-cyclopentanediol, 1,2-cyclooctanediol, 1,4-cyclooctanediol, 1,5-cyclooctanediol, dicyclohexyl-4,4'-diol and 1,2-benzene dimethanol.

5. The polyacylurethane according to claim 1, wherein R$_1$ represents a residue of diol having a number average molecular weight of 300 to 30,000.

6. The polyacylurethane according to claim 1, wherein R$_1$ represents a residue of diol selected from the group consisting of polyethylene glycol, polycaprolactone diol, polytetrahydrofuran diol, polypropylene glycol, polybutadiene diol and polydimethylsiloxane diol.

7. The polyacylurethane according to claim 1, wherein R$_2$ is selected from the group consisting of an ethylene group, a 1,2-phenylene group, a 1,2-cyclohexylene group and an ethynyl group.

8. A process for producing polyacylurethane having a number average molecular weight of 500–100,000, wherein the main chain of said polyacylurethane comprises repeating units of the formula:

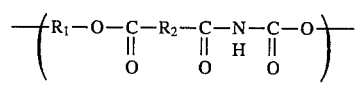

comprising a step of polymerizing at least one acyl carbamate of the formula:

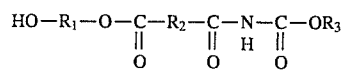

wherein R$_1$ represents an alkylene group or an alkenylene group having a molecular weight of 28 to 30,000, which may contain an alicyclic group, an aromatic group and/or an oxygen atom; and R$_2$ represents an alkylene group, an arylene group or an alkenylene group having 1 to 8 carbon atoms; and R$_3$ represents an alkyl or aryl group having 1 to 18 carbon atoms, which may contain an oxygen atom.

9. The process for producing polyacylurethane according to claim 8, wherein R$_1$ represents a residue of diol having 1 to 18 carbon atoms.

10. The process for producing polyacylurethane according to claim 8, wherein $R_1$ represents a residue of diol selected from the group consisting of alkanediol, alkenediol, ether bond-containing diol, alicyclic group-containing diol and arylalkylene group-containing diol.

11. The process for producing polyacylurethane according to claim 8, wherein $R_1$ represents a residue of diol selected from the group consisting of ethylene glycol, 1,2-propylene glycol, 1,3-propylene glycol, 1,3-butanediol, 1,4-butanediol, 1,4-pentanediol, 1,5-pentanediol, neopentyl glycol, 1,6-hexanediol, 1,9-nonanediol, 1,10-decanediol, 1,12-dodecanediol, 1,2-octadecanediol, 1,8-octadecanediol, 2,5-dimethyl-2,5-hexanediol, 2,2-dimethyl-1,3-propanediol, 2,5-diethyl-2,5-hexenediol, 2-butenediol, 3-hexenediol, diethylene glycol, triethylene glycol, 1,2-cyclohexanediol, 1,3-cyclohexanediol, 1,4-cyclohexanediol, 1,2-cyclopentanediol, 1,2-cyclooctanediol, 1,4-cyclooctanediol, 1,5-cyclooctanediol, dicyclohexyl-4,4'-diol and 1,2-benzene dimethanol.

12. The process for producing polyacylurethane according to claim 8, wherein $R_1$ represents a residue of diol having a number average molecular weight of 300 to 30,000.

13. The process for producing polyacylurethane according to claim 8, wherein $R_1$ represents a residue of diol selected from the group consisting of polyethylene glycol, polycaprolactone diol, polytetrahydrofuran diol, polypropylene glycol, polybutadiene diol and polydimethylsiloxane diol.

14. The process for producing polyacylurethane according to claim 8, wherein $R_2$ is selected from the group consisting of an ethylene group, a 1,2-phenylene group, a 1,2-cyclohexylene group and an ethynyl group.

15. The process for producing polyacylurethane according to claim 8, wherein $R_3$ represents an alkyl or aryl group having 1 to 8 carbon atoms, which may contain an oxygen atom.

* * * * *